United States Patent [19]
Khalid

[11] Patent Number: 5,269,136
[45] Date of Patent: Dec. 14, 1993

[54] SUB-IDLE STABILITY ENHANCEMENT AND ROTATING STALL RECOVERY

[75] Inventor: Syed J. Khalid, Palm Beach Gardens, Fla.

[73] Assignee: United Technologies Corporation, Hartford, Conn.

[21] Appl. No.: 859,767

[22] Filed: Mar. 30, 1992

[51] Int. Cl.$^5$ ............................................. F02K 11/15
[52] U.S. Cl. ..................................... 60/204; 60/238; 60/239
[58] Field of Search ................. 60/204, 235, 238, 239, 60/242

[56] References Cited

U.S. PATENT DOCUMENTS

| | | | |
|---|---|---|---|
| 2,516,909 | 8/1950 | Redding et al. | 60/239 |
| 2,738,644 | 3/1956 | Alford | 60/235 |
| 2,972,858 | 2/1961 | Paulick | 60/239 |
| 3,854,287 | 12/1974 | Rembold | 60/239 |
| 4,159,625 | 7/1979 | Kerr | 60/238 |
| 4,294,069 | 10/1981 | Camp | 60/239 |

Primary Examiner—Louis J. Casaregola
Attorney, Agent, or Firm—Robert E. Greenstien

[57] ABSTRACT

In an aircraft gas turbine engine having a variable area exhaust, gas turbine compressor operating conditions are sensed to determine a sub-idle condition or a rotating stall. The exhaust area is increased to a maximum when a sub-idle condition is present. If a condition associated with a rotation stall is sensed, fuel flow is decremented but not below a minimum flow. When the rotating stall ends, fuel flow is restored to the normal level and then the engine reaches stabilized operating conditions, the nozzle area is restored at a scheduled rate.

6 Claims, 4 Drawing Sheets

SUB-IDLE STABILITY ENHANCEMENT AND ROTATING STALL RECOVERY

TECHNICAL FIELD

This invention relates to gas turbine engines, in particular, aircraft gas turbine engines with variable area exhaust nozzles.

BACKGROUND OF THE INVENTION

In a gas turbine engine and, in particular, an aircraft gas turbine engine, compressor stalls must be avoided as much as possible. There are different types of stalls. One, a full span non-recoverable rotating or rotary stall, brings about a major loss in thrust because a large section of the compressor stops pumping and the compressor does not return to normal operation. Less serious compressor stalls appear as partial span rotating stalls near the blade tips. However, these partial span rotating stalls can lead to the undesirable compressor "surge" phenomenon in which the complete flow transiently reverses followed by a recovery to nearly normal operation. The flow reversal and subsequent recovery "attempt" can repeat for several cycles. A compressor with good recoverability characteristics will automatically return to normal operation after very few surge cycles. The momentary thrust loss for a portion of a second during surge and recovery can have minimal impact on aircraft performance; however, surge must be avoided since it can cause structural damage. Also surge can sometimes transition into the highly dangerous mode of non-recoverable full span rotating stall, which results in very low thrust as well as turbine damage, from overheating.

Companion patent applications titled "On-Line Stall Margin Adjustment in a Gas Turbine Engine" and "Controlling Stall Margin in a Gas Turbine Engine During Acceleration", Ser. No. 07/789,556 and 07/789,557 (U.S. Pat. No. 5,165,845) respectively, both filed on Nov. 8, 1991, and assigned to the assignee hereof, concern techniques for preventing partial span stalls and surges. Full span rotating stalls on the other hand, are associated with a deficiency in the engine system's recoverability characteristics. In that regard, investigations have shown that engine recoverability is dependent on many factors including compressor design parameters, engine components, volumes, combustion stability and engine cycle.

Mass flow through the compressor stage is a function of several factors. In a full-span rotating stall, mass flow can be so small that the resulting high fuel air ratios cause internal engine temperatures to rise to potentially destructive levels. If allowed to continue, this "hung" stall condition can lead to serious engine damage. When the compressor in it is a hung stall, the pilot must shut down the engine and then try to restart it, something that is not easy to do especially quickly.

DISCLOSURE OF THE INVENTION

The invention is predicated on the observation that as an engine enters a rotation stall, combustor pressure (PB) does not immediately decline to an unsustainable minimum level but rather oscillates for an extended time as the compressor tries to re-establish full pressure but at sub-idle speed (N2), e.g. less than 70% of normal N2. If nothing is done, the compressor will enter a hung stall condition.

An object of the present invention is to find an efficient, automatic way to correct a rotating stall condition in a gas turbine engine.

According to the invention, exhaust nozzle area and fuel flow are automatically adjusted to clear a full span rotating stall and then normal nozzle area and fuel flow are resumed. The adjustments take place automatically, without the pilot doing anything. The rotating stall clears because these adjustments increase the effective downstream area of the compressor.

According to the invention, when N2 reaches a selected sub-idle speed, or when the rate of N2 decay indicates a sub-idle condition will be reached, the nozzle is fully opened. If engine temperature rises, fuel flow is reduced (decremented) until the condition disappears, when normal fuel flow is resumed. When it is determined that steady state criteria can be attained, the nozzle area is gradually returned to its original size. While fuel flow is decremented, it is never allowed to go below an absolute minimum.

Among the features of the present invention, it provides a technique for avoiding a hung stall that requires no pilot intervention. In fact, the adjustments can take place very rapidly without the pilot even knowing. In that respect, the invention is particularly useful in "DEECS" (digital electronic engine control systems).

Other aspects, features and benefits of the invention may be apparent to one skilled in the art from the drawing and the description of the best mode for carrying out the invention.

BEST MODE FOR CARRYING OUT THE INVENTION

Figure 1:
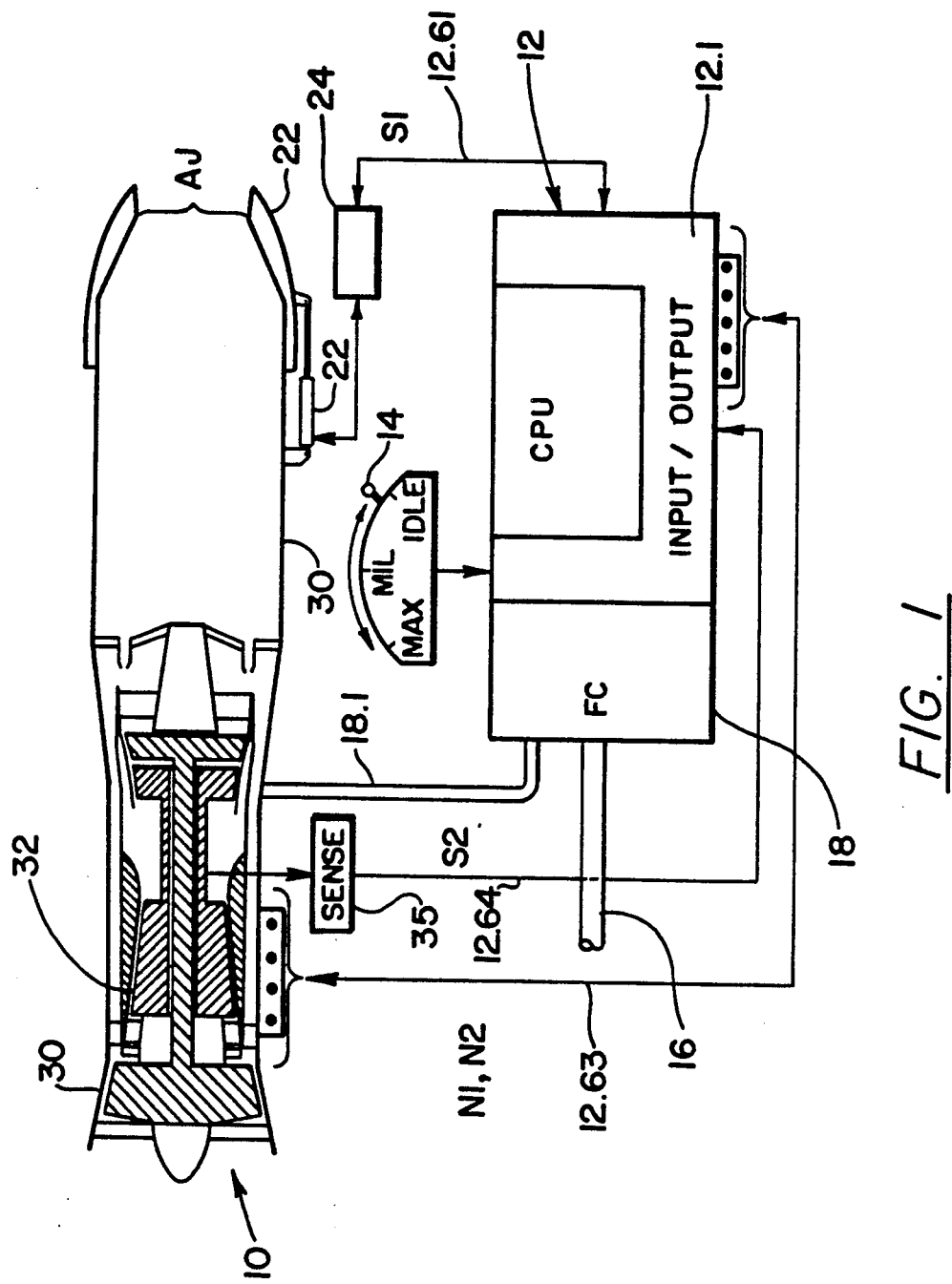
FIG. 1 is a functional block diagram showing a gas turbine engine with a variable exhaust nozzle and an electronic control system for controlling fuel flow to the engine and controlling the nozzle according to the invention.

FIG. 1 shows a gas turbine engine 10, which is controlled by an engine control 12, connected to a power lever 14 that commands appropriate fuel flow for power settings between "idle" and "max." A fuel supply line 16 is connected to a fuel control 18, controlled through an input/output ("I/O") section 12.1 of the control 12. Fuel is supplied to the engine from the fuel control 18 over a supply line 18.1. A central processing unit or signal processor (CPU) regulates the operation of the controller by receiving and providing signals thorough the I/O section or port. As stated below with regard to the flow chart in FIG. 5, the CPU is programmed, preferably digitally, to carry out signal processing sequences or routines involving tests (i.e. a program call) to invoke the invention as part of an overall program that regulates the engine through a computer based control, such the known DEECS mentioned previously. In this case, the test call generally embraces determining if a stall condition exists and modifying engine operation, particular exhaust nozzle area and fuel flow.

The engine has a variable nozzle 20 which defines the exhaust area "AJ." The nozzle is opened and closed, varying the area AJ, with a nozzle actuator 22. This actuator is controlled by an actuator driver 24 (e.g. a hydraulic control) in response to control signals S1 on line 12.6 connected to the I/O stage, on a line. Signals S1 cause the actuator to open or close the nozzle, varying the area AJ.

The engine contains a fan 30 and a compressor stage 32, both simplistically depicted. A compressor temperature sensor 35 provides a signal S2 to the controller 12 on line 12.62. Signal S2 represents (manifests) an operating condition in the compressor, temperature (TEMP), that changes at the outset of full span rotational stall. Another possible indication could be compressor pressure. In this example, compressor temperature has been used. The control also receives other signals on the operating state of the engine, such as fan speed N1 and compressor speed N2, on the line 12.63. Both are corrected ("N2C and N1C") for ambient temperature and pressure by the control using traditional signal processing. It will be described in more detail below that the control 12 processes the signals on the lines from the engine to determine if speed will decay to sub-idle levels (position 2.1 in FIG. 2) or that there is a temperature increase associated with a rotating stall. Depending upon the sequence of those signals, the control causes the nozzle to open to maximum AJ and reduces the fuel flow. Upon clearing of the rotating stall condition, the control resumes normal fuel flow for the power lever setting, which has not moved throughout this adjustment. When the control detects steady-state conditions, it gradually ramps AJ to its normal value.

Figure 2:
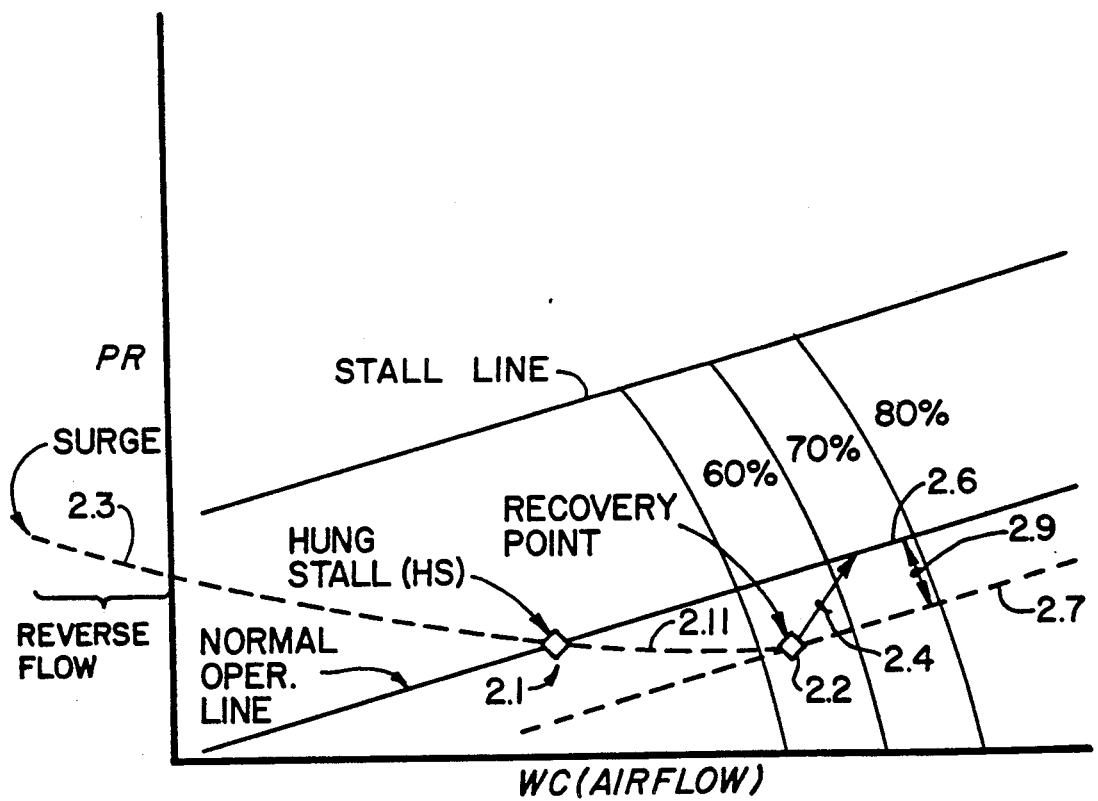
FIG. 2 is a graph showing compressed pressure ratio (PB/P25) as a function of corrected airflow (WC).
Figure 4:
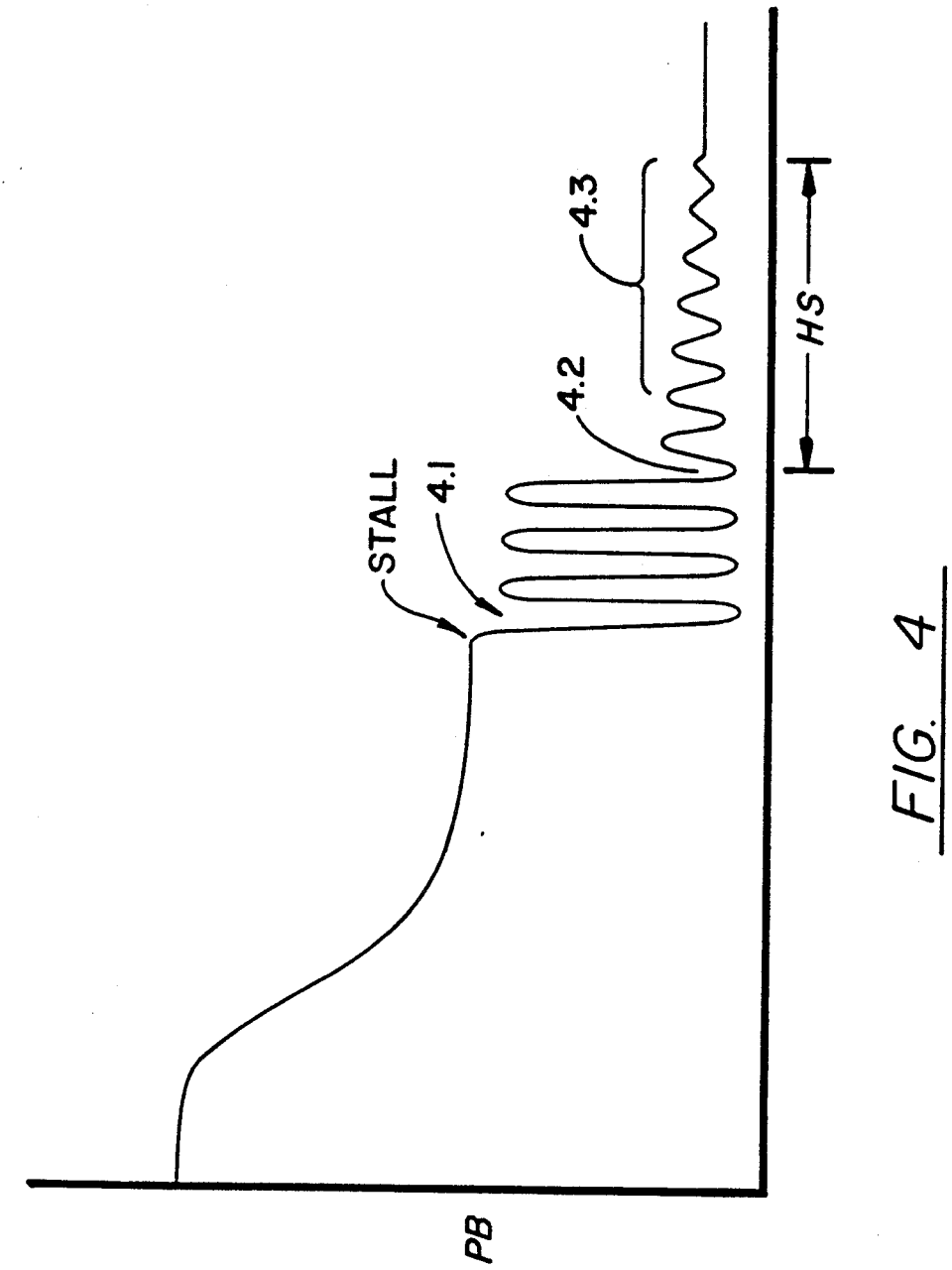
FIG. 4 is a graph showing the time related change in PB during a full span rotating stall.

FIG. 2 shows, at position 22, the airflow condition (WC) when the engine recovers from the hung stall condition; that is, when it is within the 60%-80% of compressor corrected speed. The arrow-dashed line 2-3 is included to show that the airflow can actually reverse as the compressor surges prior to entering a hung stall condition. FIG. 4 shows in the region 4.1 is where that reversal can take place. The region 4.2 corresponds to the hung stall (position 2.1, in FIG. 2). The invention detects the changes at 4.3 in FIG. 4 and modifies engine operation to prevent the compressor remaining in the hung stall condition.

Figure 5:
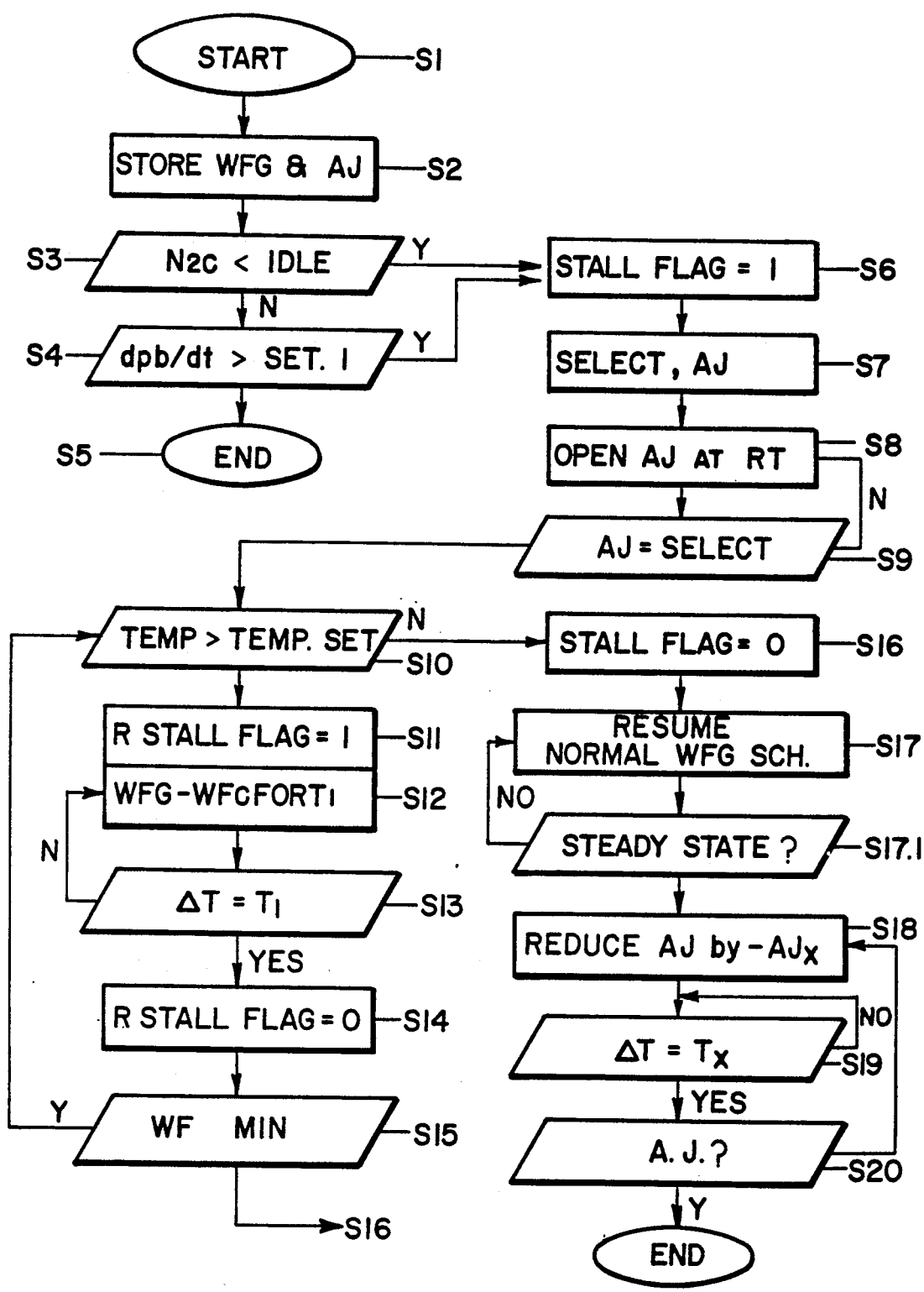
FIG. 5 is flow chart of signal processing sequences for carrying out the invention.

FIG. 5 shows signal processing sequences for use by the CPU in the control 12, to control fuel flow WFG and the exhaust area AJ. It should be understood that, using known programming techniques, this routine would be cyclically called or invoked as a subroutine in an overall CPU program that regulates controller operation. The routine involves a sequence of tests that are performed on a cyclical basis within the routine or each time the routine is called. The sequence starts at step S1 and enters step S2 at which the current fuel flow WFG and the current area AJ are stored. These are, of course, the fuel flows and the exhaust area associated with the static engine operating condition, e.g., the aircraft being in a cruise flight mode. In that regard, it should be noted that, due to some disturbance in the engine, some operating characteristics in the engine, such as its age or the internal characteristics in the compressor, the compressor temperature (TEMP) may change momentarily, a precursor to compressor surge. The static WFG and AJ having been stored at step S2, a test is made at step S3 to determine whether the compressor speed N2C (corrected for temperature) is within the sub-idle range (see 2.1 in FIG. 2) or whether speed decay is so rapid as to cause the speed to drop into the sub-idle region. This speed corresponds to a point below 70% of the normal power speed in FIG. 2. (It is typical for gas turbine engines when operating normally to be operated at 70% or higher range.) If the test at step S3 is in the affirmative or yes, a flag is sent to 1 at step S6, indicating a sub-idle condition. A test is made at step S4 which determines if the speed decay in N2C is greater than a set rate (SET.1). Both of the tests S4 and S5 lead to the step S6 if either test produces an affirmative answer. On the other hand, the sequence ends (END) on a negative answer to either test, as shown in the flow chart. At step S9 maximum nozzle are AJ is selected. Step S8 causes the nozzle to open at a particular rate $R_T$ and then in step S7 a test is made to whether or not AJ is at the area selected in step S7, that area being the maximum possible area for the exhaust. The exhaust area of the engine is opened in this way to its maximum upon the detection of a sub-idle condition in the engine, and this maximizes the mass flow through the engine, which in effect increases the effective downstream throttle area of the compressor.

Figure 3:
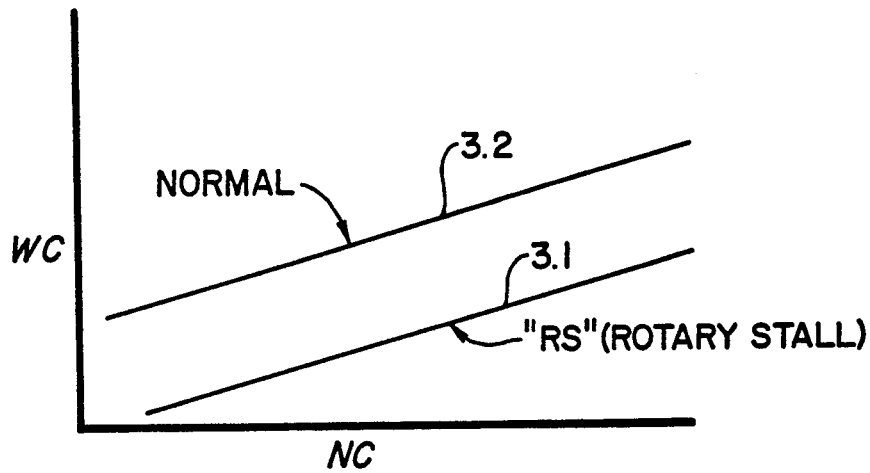
FIG. 3 is a graph showing airflow as a function of corrected compressor speed (N2C).

However, the sequence in FIG. 5 also tests for indications of the onset of a full rotating stall. This begins at step S10 which performs a test to determine whether the engine temperature TEMP e.g. signal S2 in FIG. 1, is greater than a set temperature SET.2. If the answer is no, then a stall flag is set to zero at step S16. If the test at step S10 is in the affirmative, meaning that the temperature has exceeded a preselected level, a rotating stall flag (RSTALL) is set (e.g. to 1) at step S11. At step S12, WFG is incremented down (decremented) by a fuel flow reduction quantity WFC but only until the elapsed time equals a stored value T1, a test performed in step S13. An affirmative answer, which means that the fuel flow WFG has been decremented down by WFC, causes the resetting of the flag RSTALL at step S14. At step S15, a test is made to determine whether or not actual fuel flow WF is greater than a preselected minimum (MIN), the absolute minimum fuel flow that can be used in the engine. It should be noted, on the other hand, that following conventional wisdom, it would be expected that the pilot would pull back on the power lever 14, completely reducing the fuel flow. In that context, it is worth emphasizing that throughout this process there is no motion whatsoever of the power lever 14. In fact, the pilot does not even know that the control is taking action. Assuming that the fuel flow WF is still greater than the minimum (MIN), this at step S15 produces an affirmative answer at step S15, causing the sequence to return to step S10, where the test is again made to see whether the temperature (TEMP) is above an allowable level. If so, the fuel flow will again be incremented down by WFC. The process from step S10 will continue in this way until either there is a negative answer at step S15 or the temperature no longer exceeds an acceptable temperature level (TEMP SET) producing a positive answer at step S10. A negative answer at step S15 causes the sequence to move to step S16 also the next step following a negative answer to the test made at step S10. Step S16 resets the stall flag (RSTALL) to zero then proceeds to step S17, which commands a resumption of normal fuel flow WFG, dictated by the nominal flow control schedules. In step S18, a test is made to check if the engine has attained steady-state conditions, and if the answer is in the affirmative step S19 commands a reduction in the area AJ, but by an incremental amount AJX. As shown at step S19, a test is made to determine whether that change has taken place in a preselected time $T_x$. The purpose for steps S19 and steps S20 is to slow the closure rate of the nozzles to a selected rate of change. A test is made at step S21 to see whether AJ (stored at step S2) is reached. When it is reached, yielding an affirmative answer at step S20, the sequence ends. The normal fuel flow WFG has been resumed and the original area AJ has been reestablished. Referring again to FIG. 2 it has been assumed that at the hung stall position (at 2.1), the temperature has risen to the point triggering the sequences beginning with step S11. At the point 2.1 the recovery proceeds along the dotted line 2.11 to the point 2.2 which is above the sub-idle range (above 60% power). As shown by the solid line 2.4, the engine recovers to its normal operating line at 2.6. In FIG. 2, the dash line 2.7 denotes an operating line which produces inadequate pressure and airflow. The arrow 2.9 shows the increase in effective downstream throttle area with open AJ and "deriched" WF. Two lines 3.1 and 3.2 in FIG. 3 should be noticed. Line 3.1 corresponds to the operating line for a rotating stall and as such is below line 3.2, a normal operation line. Both lines show the functional relationship between compressor speed NC and airflow WC. But line 3.1 has inadequate airflow for a particular compressor speed and so properly represents a condition at which mass flow through the engine is insufficient to produce low enough fuel/air ratios, which is the reason for the temperature (TEMP) exceeding TEMP SET. The line path SURGE shows the flow path during a surge recovery condition.

The foregoing is a description of the best mode for carrying out the invention. Various modifications and alterations may be made in whole or in part by one skilled in the art without departing from the true scope and spirit of the invention. For instance, temperature has been shown as the preferred way to initiate the fuel control adjustments. But it is possible to use other parameters, such as pressure or perhaps taking time derivative compressor speed. Other modifications and variations may be apparent to one skilled in the art.

I claim:

1. A gas turbine engine comprising, an exhaust nozzle operable to vary the exhaust area from the engine, a nozzle control for operating the nozzle, and a control for controlling fuel flow to the engine in response to a power lever and for controlling said nozzle to vary nozzle area, the control comprising signal processing means for performing tests on engine operation characterized by:

means for storing an exhaust area signal manifesting a first magnitude of nozzle area during engine operation during a first test; for providing a sub-idle speed signal manifesting a sub-idle engine speed condition based on measured compressor speed being below a selected stored level; and for providing an exhaust nozzle control signal to the nozzle control to increase the exhaust area to a maximum area in response to said auto-idle.

2. An engine as described in claim 1, characterized in that signal processing means comprises means for providing a compressor pressure change signal that manifests a negative rate of change in compressor pressure exceeding a selected value and for providing said exhaust control signal in response to said compressor change signal.

3. An engine as described in claim 1, characterized in that said signal processing means comprises means for providing a compressor temperature change signal that manifests that the compressor temperature has exceeded a stored temperature value; for providing a fuel flow signal manifesting a first magnitude of fuel flow according to a fuel flow schedule; for providing a fuel flow decrement signal to incrementally decrease fuel flow from said first magnitude by a stored increment over selected time intervals until said temperature change signal is no longer provided or fuel flow reaches a stored minimum level; for providing a fuel flow restoration signal to restore fuel flow to a rate according to said schedule when said temperature signal is no longer provided; and for providing an exhaust nozzle area reduction signal to reduce the exhaust nozzle area to said first magnitude of nozzle area when said temperature signal is no longer provided.

4. A method for controlling stalls in gas turbine engine comprising, an exhaust nozzle operable to vary the exhaust area from the engine, a nozzle control for operating the nozzle, and a control for controlling fuel flow to the engine in response to the displacement of a power lever and for controlling said nozzle control to vary nozzle area comprising signal processing means for performing tests on engine operation characterized by:

storing an exhaust area signal manifesting exhaust a first magnitude of nozzle area during engine operation during a test;

providing an idle speed signal manifesting a sub-idle engine speed condition based on measured compressor speed being below a selected stored level; and providing an exhaust nozzle control signal to the nozzle control to increase the exhaust area to a maximum area in response to said sub-idle signal.

5. A method as described in claim 4, characterized by;

providing a compressor pressure change signal that manifests a negative rate of change in compressor pressure exceeding a selected value; and providing said exhaust control signal in response to said compressor change signal.

6. A method as described in claim 5, characterized by:

providing a compressor temperature change signal that manifests that the compressor temperature has exceeded a stored temperature value;

providing a fuel flow signal manifesting a first magnitude of fuel flow to the engine according to a fuel flow schedule when said temperature signal is provided; providing a fuel flow decrement signal to incrementally decreased fuel flow by a stored incfement over selected time intervals until said temperature change signal is no longer provided or fuel flow reaches a stored minimum level;

providing a fuel flow restoration signal to increase fuel flow to a magnitude according to said schedule when said temperature signal is no longer provided; and providing an exhaust nozzle area reduction signal to reduce the exhaust nozzle area to said first magnitude of nozzle area when said temperature signal is no longer provided.

* * * * *